US008639106B1

(12) United States Patent
Gleason et al.

(10) Patent No.: US 8,639,106 B1
(45) Date of Patent: Jan. 28, 2014

(54) MAGNETIC ADD-ON LENSES WITH ALIGNMENT RIDGE

(71) Applicant: Apple Inc., Cupertino, CA (US)

(72) Inventors: Jeffrey Nathan Gleason, San Francisco, CA (US); Misha Scepanovic, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/707,463

(22) Filed: Dec. 6, 2012

(51) Int. Cl.
*G03B 13/34* (2006.01)
*G03B 17/14* (2006.01)

(52) U.S. Cl.
USPC .......................................... 396/133; 396/529

(58) Field of Classification Search
USPC .............. 396/71, 133, 529; 348/360; 359/827
See application file for complete search history.

(56) References Cited

U.S. PATENT DOCUMENTS

| 2,953,970 | A  | * | 9/1960 | Maynard ........................ 359/611 |
| 6,889,006 | B2 | * | 5/2005 | Kobayashi ......................... 396/6 |
| 7,600,932 | B2 | * | 10/2009 | Senba et al. ................... 396/529 |
| 7,609,465 | B2 |   | 10/2009 | Wu |
| 7,990,636 | B2 |   | 8/2011 | Park et al. |
| 8,073,324 | B2 | * | 12/2011 | Tsai ................................ 396/544 |
| 2007/0122145 | A1 | * | 5/2007 | Chang ............................ 396/529 |
| 2012/0008220 | A1 |   | 1/2012 | Lee et al. |
| 2012/0268648 | A1 | * | 10/2012 | Yang ............................. 348/360 |
| 2013/0163980 | A1 | * | 6/2013 | Lazaridis et al. ............. 396/529 |

FOREIGN PATENT DOCUMENTS

JP 08-227096 9/1996

* cited by examiner

*Primary Examiner* — W B Perkey
(74) *Attorney, Agent, or Firm* — Blakely, Sokoloff, Taylor & Zafman LLP

(57) ABSTRACT

A camera system includes a housing with an aperture and an alignment feature surrounding the aperture to define an optical axis extending through the aperture. A camera module is mounted inside the housing and engages the alignment feature to align the camera module with the optical axis. A lens assembly that may have a moveable element is included in the camera module. A voice coil motor may support the moveable element of the lens assembly. A plurality of magnets are arranged on the camera module adjacent to the alignment feature to retain a detachable lens on the housing and engage the alignment feature to align the detachable lens with the optical axis. The plurality of magnets may be further arranged to minimize interference with the voice coil motor and movement of the moveable element of the lens assembly.

22 Claims, 5 Drawing Sheets

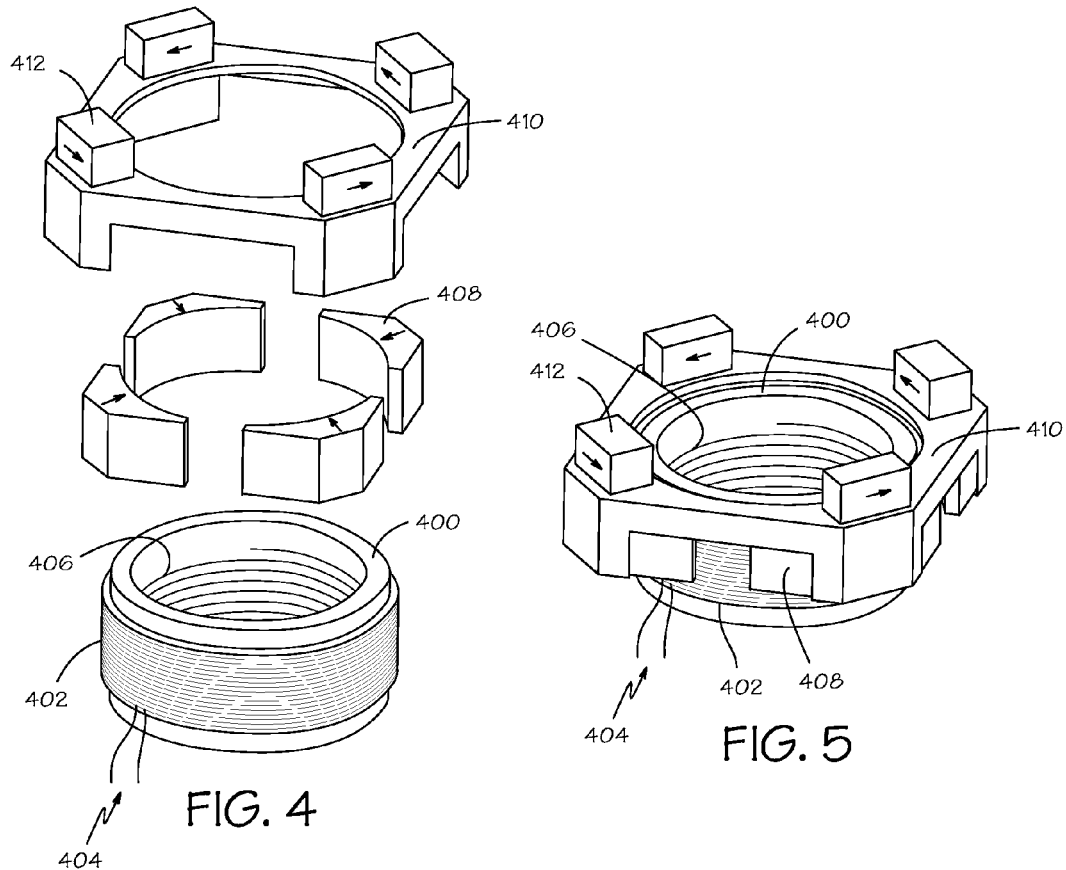
FIG. 4
FIG. 5
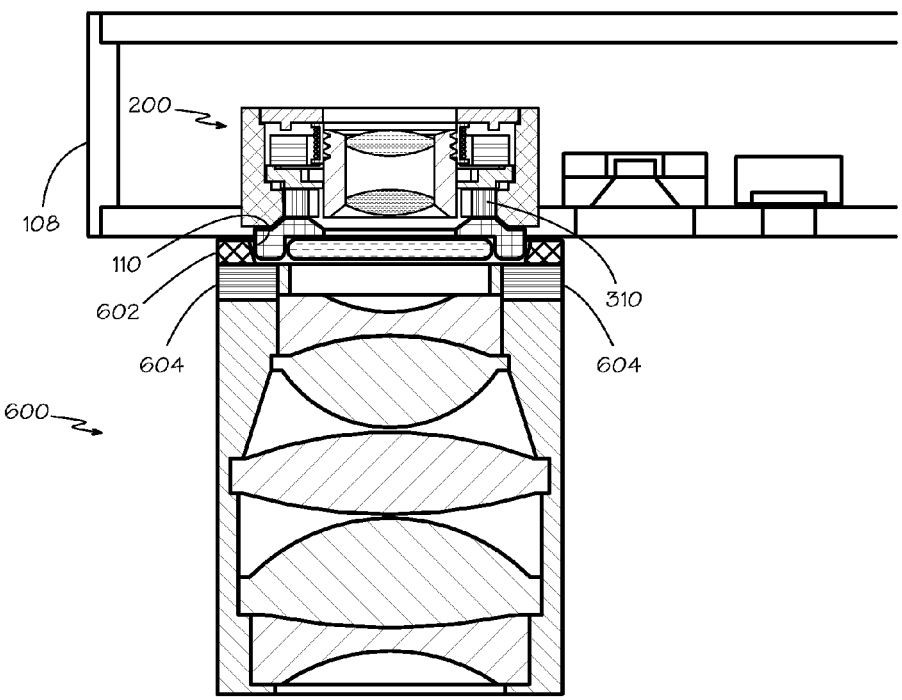
FIG. 6

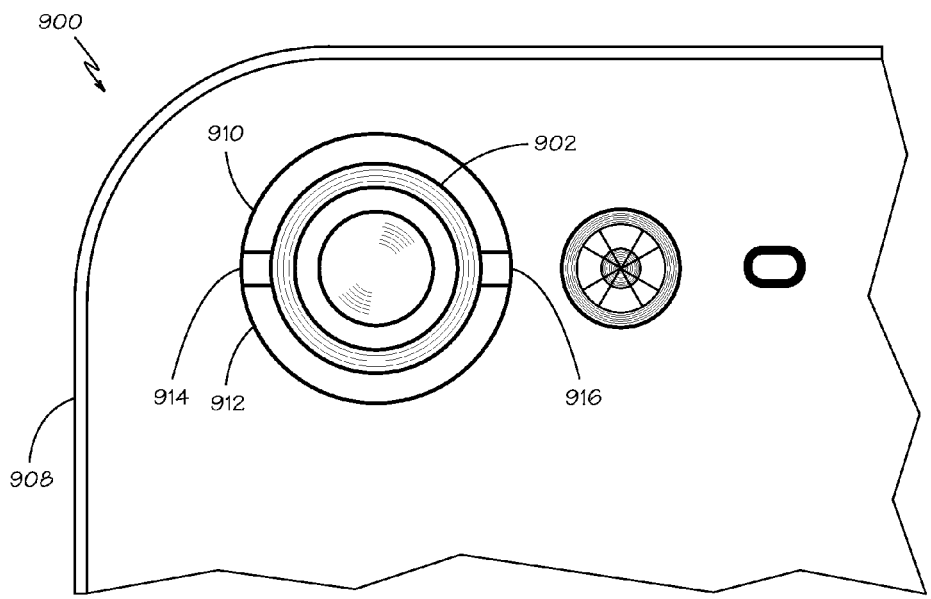
FIG. 9
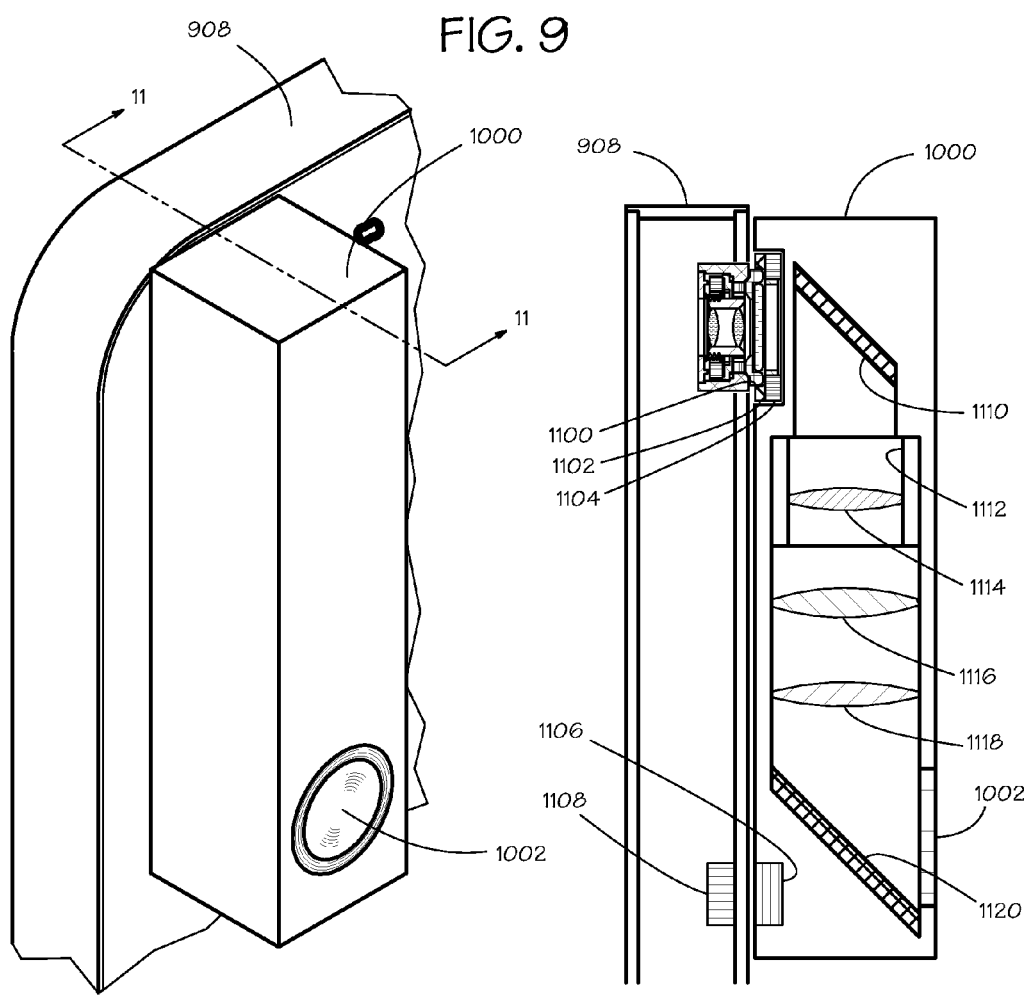
FIG. 10
FIG. 11

MAGNETIC ADD-ON LENSES WITH ALIGNMENT RIDGE

BACKGROUND

1. Field

Embodiments of the invention relate to the field of camera lenses; and more specifically, to lens mounts for securing an additional lens in the photographic light path.

2. Background

Cameras are being added to multi-function devices such as computers and mobile telephones that do not provide the structures found in conventional cameras that provide only an image capture function. Multi-function devices are often thin, offering little room for the optical elements of the camera portion of the device. This has led to the development of extremely compact camera modules that provide increasingly sophisticated image capturing in a very small device. In turn, the availability of these small camera modules has resulted in the production of extremely compact and thin single function cameras that also lack the structures found in conventional cameras.

Regardless of the amount of miniaturization of these camera modules, there is a limit to the types of optics that can be provided in the space available in a multi-function device or ultra-compact camera. The optics for providing a telephoto lens and other specialty lenses require a certain length for their optical path, which often is unavailable within a small device. Further, users generally want to use a specialty lens intermittently. Therefore it is desirable to be able to change the lenses that are in the optical path to provide specialty optics when desired.

It is possible to provide an additional lens, which may be an assembly including multiple lens elements, that works in conjunction with a lens provided by a camera module to provide specialty lens functions. When an additional lens is placed in the photographic light path, it is important that the additional lens be aligned with the optical axis of the lens provided by a camera module to provide good image quality. Existing compact devices that use compact camera modules generally do not provide the types of lens mounting structures found in conventional cameras due to space constraints. This makes it difficult to retain an additional lens and align it correctly with a compact camera module on a compact device.

It would be desirable to provide a lens mount for an additional lens that works in conjunction with a lens provided by a camera module on a compact device.

SUMMARY

A camera system includes a housing with an aperture and an alignment feature surrounding the aperture to define an optical axis extending through the aperture. A camera module is mounted inside the housing and engages the alignment feature to align the camera module with the optical axis. A lens assembly that may have a moveable element is included in the camera module. A voice coil motor may support the moveable element of the lens assembly. A plurality of magnets are arranged on the camera module adjacent to the alignment feature to retain a detachable lens on the housing and engage the alignment feature to align the detachable lens with the optical axis. The plurality of magnets may be further arranged to minimize interference with the voice coil motor and movement of the moveable element of the lens assembly.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, the size and relative sizes of layers and regions may be exaggerated for clarity. Like reference numerals indicate similar elements.

FIG. 4 is an exploded view of a portion of a voice coil motor (VCM).

FIG. 5 is an assembled view of the portion of the VCM shown in FIG. 4.

FIG. 6 is a cross-section view of a detachable lens mounted outside the housing of the compact device.

FIG. 9 shows a portion of another compact device, such as a cellular telephone, that embodies the invention.

FIG. 10 is a pictorial view of a camera system that includes a detachable lens that lies along the housing of the compact device.

FIG. 11 shows a section view of the detachable lens and the housing taken along section line 11-11 in FIG. 10.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Explanations that duplicate one another may have been omitted.

The meaning of specific terms or words used in the specification and claims should not be limited to the literal or commonly employed sense, but may be different and should be construed in the context of the specification. The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

Figure 1:
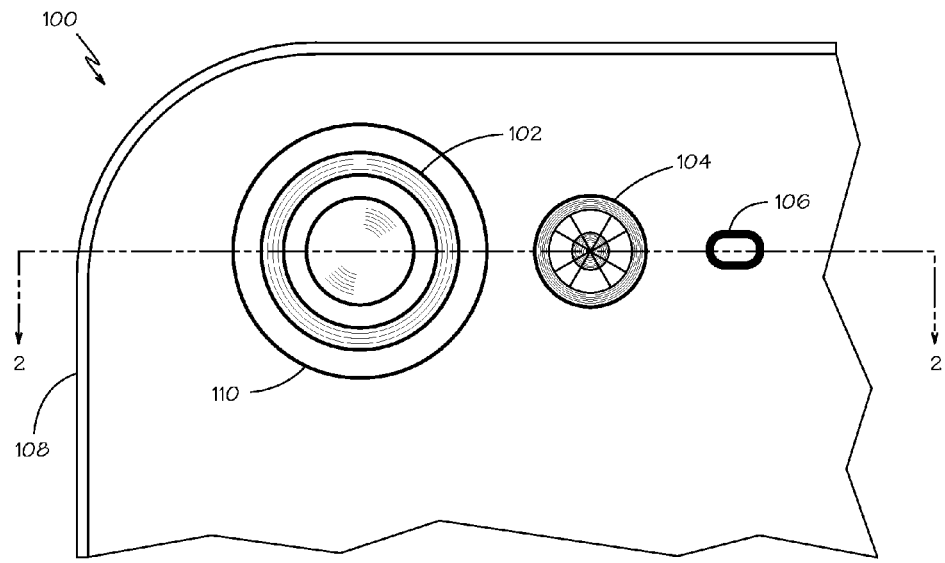
FIG. 1 shows a portion of a compact device, such as a cellular telephone, that embodies the invention.

FIG. 1 shows a portion of a compact device 100, such as a cellular telephone, that embodies the invention. The portion of the device 100 shown includes a camera system. Visible on the front of the device 100 are a lens portion 102 of a camera module, a lamp lens 104 for directing illumination to a photographic subject, and a microphone aperture 106 that may be used for admitting sound to be recorded in conjunction with image capture. In some embodiments the lamp and/or the microphone may not be present.

Figure 2:
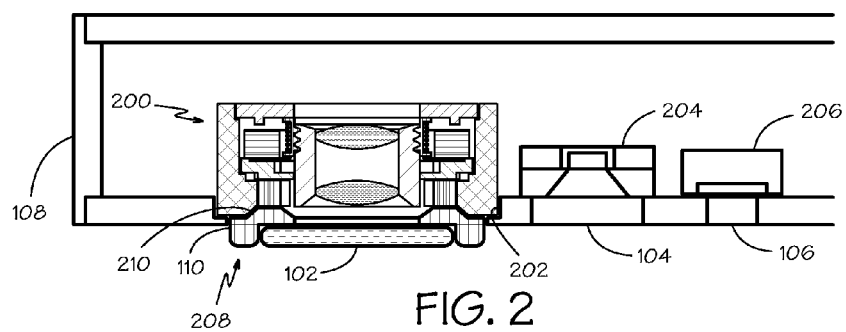
FIG. 2 shows a section view of the device taken along section line 2-2 in FIG. 1.
Figure 3:
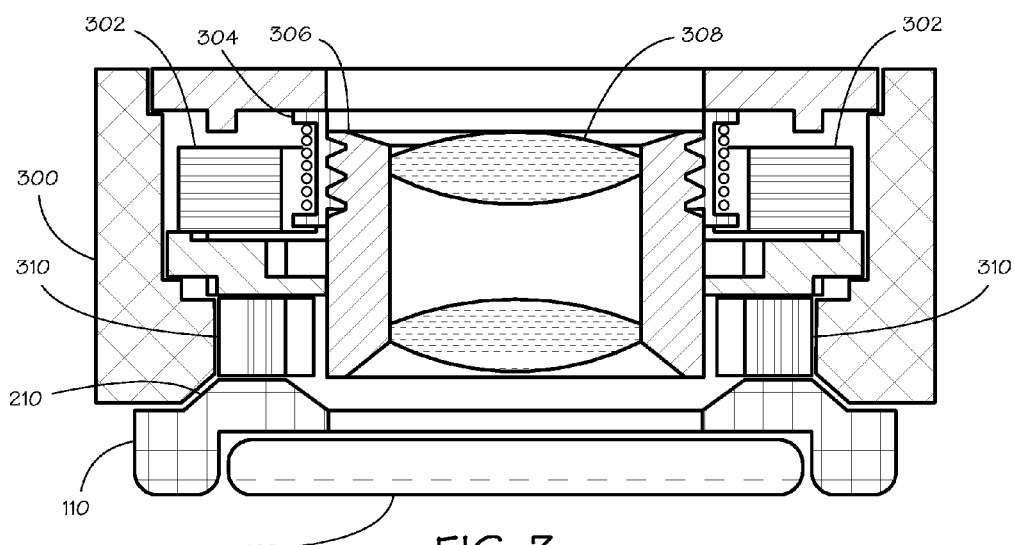
FIG. 3 shows an enlarged view of the camera module from FIG. 2.

FIG. 2 shows a section view of the device 100 taken along section line 2-2 in FIG. 1. FIG. 3 shows an enlarged view of the camera module 200 from FIG. 2. A lamp assembly 204 may be provided for illuminating a photographic subject through the lamp lens 104. A microphone 206 may be in communication with the microphone aperture 106 to receive the admitted sound.

The housing 108 of the device 100 provides a protective enclosure for the components of the device including a camera system. The housing 108 has an aperture 202 that provides an opening in the housing. A camera module 200 is mounted inside the housing 108 with a light path 206 that passes through the aperture 202. The camera module 200 includes a lens assembly 306.

An alignment feature 208 surrounds the aperture 202. The alignment feature 208 aligns with the lens assembly optics 308 of the camera module 200 to define an optical axis. The alignment feature 208 may be fixed within the aperture 202 in the housing 108 and engage a corresponding surface 210 on the camera module 200 to align the optics 308 of the camera module 200 with the optical axis of the alignment feature. In another embodiment, the alignment feature 208 may be fixed to the camera module 200 in alignment with the optics of the camera module. Both embodiments provide an engagement surface 110 outside the housing 108. The exterior engagement surface 110 of the alignment feature 208 may engage a first end of a detachable lens mounted outside the housing to mechanically align the detachable lens with the optical axis of the optics of the camera module 200. A number of magnets 310 are mounted inside the housing 108 adjacent to the engagement surface of the alignment feature 208 to retain the detachable lens in alignment with the optical axis. The magnets may be fastened to an inside surface of the housing 108 or to a surface of the camera module 200 that is adjacent the inside surface of the housing.

The alignment feature preferably aligns an optical axis of the detachable lens and an optical axis of the camera module each within about $125 \times 10^{-6}$ meters (125 μm) or about 0.0005 inch of the optical axis defined by the alignment feature. The alignment feature preferably aligns the optical axis of the detachable lens and the optical axis of the camera module each within about a one degree angle from the optical axis defined by the alignment feature.

The lens assembly 306 may include at least one moveable element 308. The camera module 200 may include a voice coil motor 302, 304 that moveably supports the moveable element 308 of the lens assembly 306. The magnets 310 provided to retain the detachable lens may be attached to the camera module 200 and arranged to minimize interference with the voice coil motor 302, 304 and movement of the moveable element 308 of the lens assembly 306.

FIG. 4 is an exploded view of a portion of a voice coil motor (VCM). FIG. 5 is an assembled view of the portion of the VCM shown in FIG. 4. The VCM includes a lens carrier 400 that supports a lens assembly, such as by a threaded engagement 406. A wire coil 402 is wound around the exterior of the lens carrier 400. The two ends 404 of the wire coil extend from the VCM to receive a controlled electrical current. A number of permanent magnet pole pieces 408 surround the wire coil 402 in the assembled VCM. A frame 410 may support the pole pieces 408 and provide a movable support for the lens carrier 400. The permanent magnet pole pieces 408 are oriented as suggested by the arrows shown on the pole pieces to provide a magnetic field around the wire coil 402. Energizing the wire coil 402 by supplying an electric current to the two ends 404 of the wire coil creates a magnetic field of a controlled strength that interacts with the magnetic field created by the permanent magnet pole pieces 408 to controllably move the lens carrier 400. The movement of the lens assembly by the VCM may provide various optical functions such as autofocus, lens zoom, anti-shake, or a combination of such functions.

Additional permanent magnets 412 are provided adjacent to the engagement surface of the alignment feature 208 to retain a detachable lens in alignment with the optical axis. As suggested by the arrows on the permanent magnets 412, the lens retaining magnets 412 may be oriented with their magnetic poles aligned substantially at right angles to the magnetic poles of the permanent magnet pole pieces 408. It has been found that such a relationship between the lens retaining magnets 412 and the permanent magnet pole pieces 408 minimizes the interference of the lens retaining magnets on the function of the VCM. Conversely, it has been found that aligning the poles of the lens retaining magnets 412 and the permanent magnet pole pieces 408 to be substantially parallel, with either the same or opposing polarities, produces a significant interference of the lens retaining magnets with the function of the VCM when the magnets are as close to the VCM as required by a compact camera system.

FIG. 6 is a cross-section view of a detachable lens 600 mounted outside the housing 108 of the compact device. A first end 602 of the detachable lens 600 engages the exterior engagement surface 110 of the alignment feature 208 (FIG. 3) to mechanically align the detachable lens with the optical axis of the optics of the camera module 200. The detachable lens 600 includes a retainer 604 adjacent the first end 602 of the detachable lens that holds the detachable lens on the camera housing 108 by magnetically engaging the magnets 310 that are on an opposite side of the camera housing from the surface that engages the alignment feature. The retainer 604 may be a non-magnetic material that is attracted by the magnets 310 inside the camera housing. In another embodiment, the retainer 604 may be one or more magnets arranged to be attracted by the magnets 310 inside the camera housing.

Figure 7:
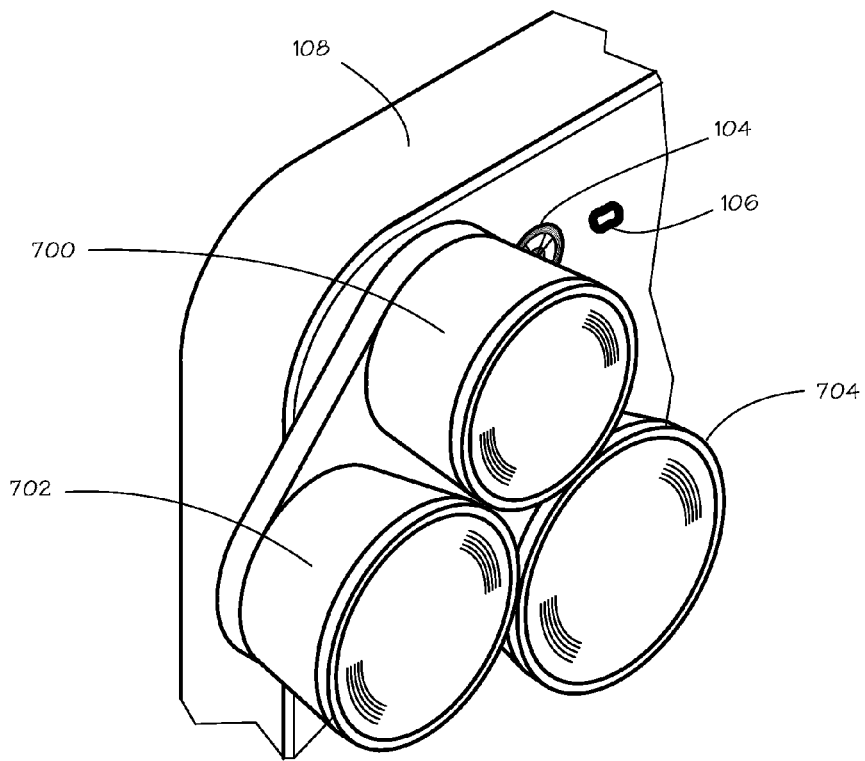
FIG. 7 is a pictorial view of a camera system that includes one or more additional lenses coupled to a detachable lens.

FIG. 7 is a pictorial view of a camera system that includes one or more additional lenses 702, 704 coupled to a detachable lens 700 such that either the detachable lens or the additional lens can selectably engage the alignment feature. The camera system may include an additional magnet mounted on the housing 108 at a sufficient distance from the camera module to minimize interference with the voice coil motor and movement of the moveable element of the lens assembly. The additional magnet engages at least one of the additional lenses 702, 704 to stabilize the coupled lens assembly on the camera body when the detachable lens 200 engages the alignment feature.

Figure 8:
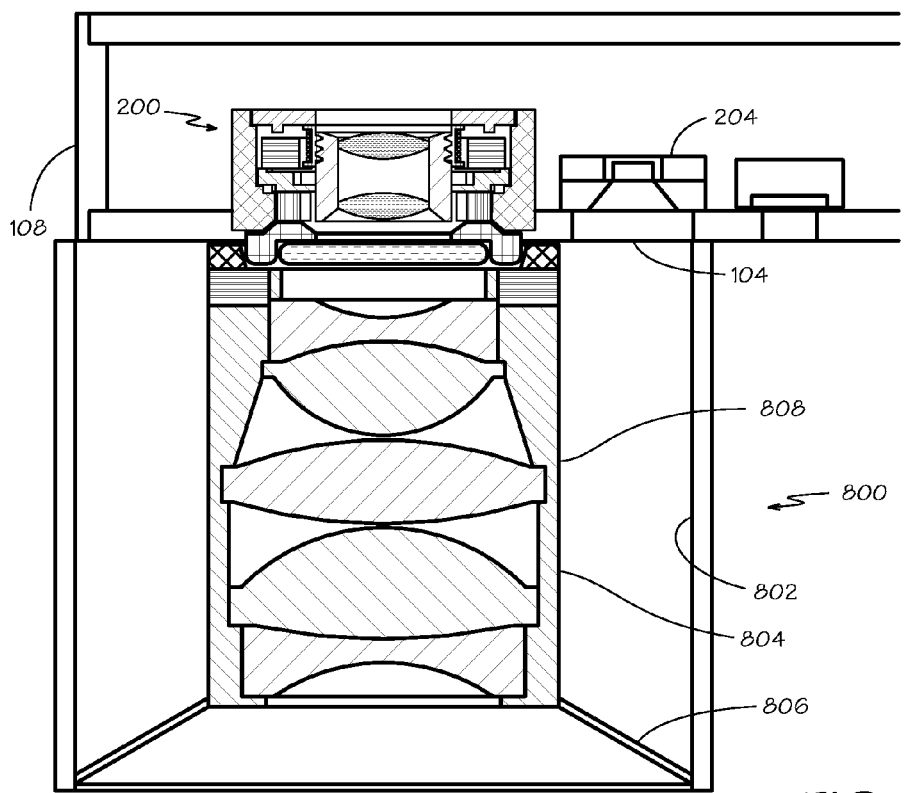
FIG. 8 is a cross-section view of another detachable lens mounted outside the housing 108 of the compact device.

FIG. 8 is a cross-section view of another detachable lens 800 mounted outside the housing 108 of the compact device. The detachable lens 800 includes a light pipe that directs light from a light source 104, 204 on the housing 108 to a diffuser 806 coupled to the detachable lens 800 at an end furthest from the housing and the light source 104, 204. The light pipe may include a cylindrical reflector 802 that is coaxial with the optical elements 808 of the lens 800. The cylindrical reflector 802 may cooperate with an external reflective surface 804 of a cylindrical mount that supports the optical elements 808 to reflect and disperse the light emitted by the lamp lens 104 on the housing 108 of the compact device to provide a reasonably uniform illumination of the diffuser 806. The diffuser 806 illuminates a subject being photographed with a "ring light" that surrounds the lens.

FIG. 9 shows a portion of another compact device 900, such as a cellular telephone, that embodies the invention. The portion of the device 900 shown includes a camera system.

Visible on the front of the device 900 is a lens portion 902 of a camera module. An alignment feature 208 surrounds the aperture 202. The alignment feature 208 aligns with the lens assembly optics 308 of the camera module 200 to define an optical axis. An alignment feature that includes an engagement surface 910, 912, 914, 916 surrounds the aperture 902. The alignment feature aligns with the lens assembly optics of the camera module to define an optical axis as described above in connection with FIGS. 1-3.

The alignment feature is made from two or more electrically conductive segments 910, 912 coupled by electrically insulating segments 914, 916. The electrically conductive segments 910, 912 may provide power and/or control signals to a detachable lens that engages the alignment feature. The electrically conductive segments 910, 912 may receive data and/or control signals from a detachable lens that engages the alignment feature. In some embodiments the electrically insulating segments 914, 916 may be of a size that creates a mechanical index to control the angular position of a detachable lens that engages the alignment feature.

FIG. 10 is a pictorial view of a camera system that includes a detachable lens 1000 that lies along the housing 908 of the compact device when the detachable lens engages the alignment feature of the camera module. This may be advantageous for lenses that require a long optical path and would otherwise project a substantial distance from the compact device.

FIG. 11 shows a section view of the detachable lens 1000 and the housing 908 taken along section line 11-11 in FIG. 10. The detachable lens 1000 includes two optical elements, such as mirrors 1110, 1120 that each bend the optical path at a right angle. This allows the optical elements, such as one or more lenses 1114, 1116, 1118, to be placed on an optical path that is at right angles to the optical patch of the camera module and parallel to a face of the housing. The mirror 1120 or other optical element that bends the optical path at a right angle furthest from the camera module redirects the optical path to be parallel to the optical path of the camera module allowing light from the scene being photographed to enter the detachable lens 1000 through a forward facing aperture 1002.

The camera system may include an additional magnet 1108 mounted on the housing 908 at a sufficient distance from the camera module to minimize interference with the voice coil motor and movement of the moveable element of the lens assembly. The additional magnet 1108 may engage another magnet 1106 or magnetic catch in the detachable lens 1000 to stabilize the detachable lens on the camera body when the detachable lens engages the alignment feature.

Figure 12:
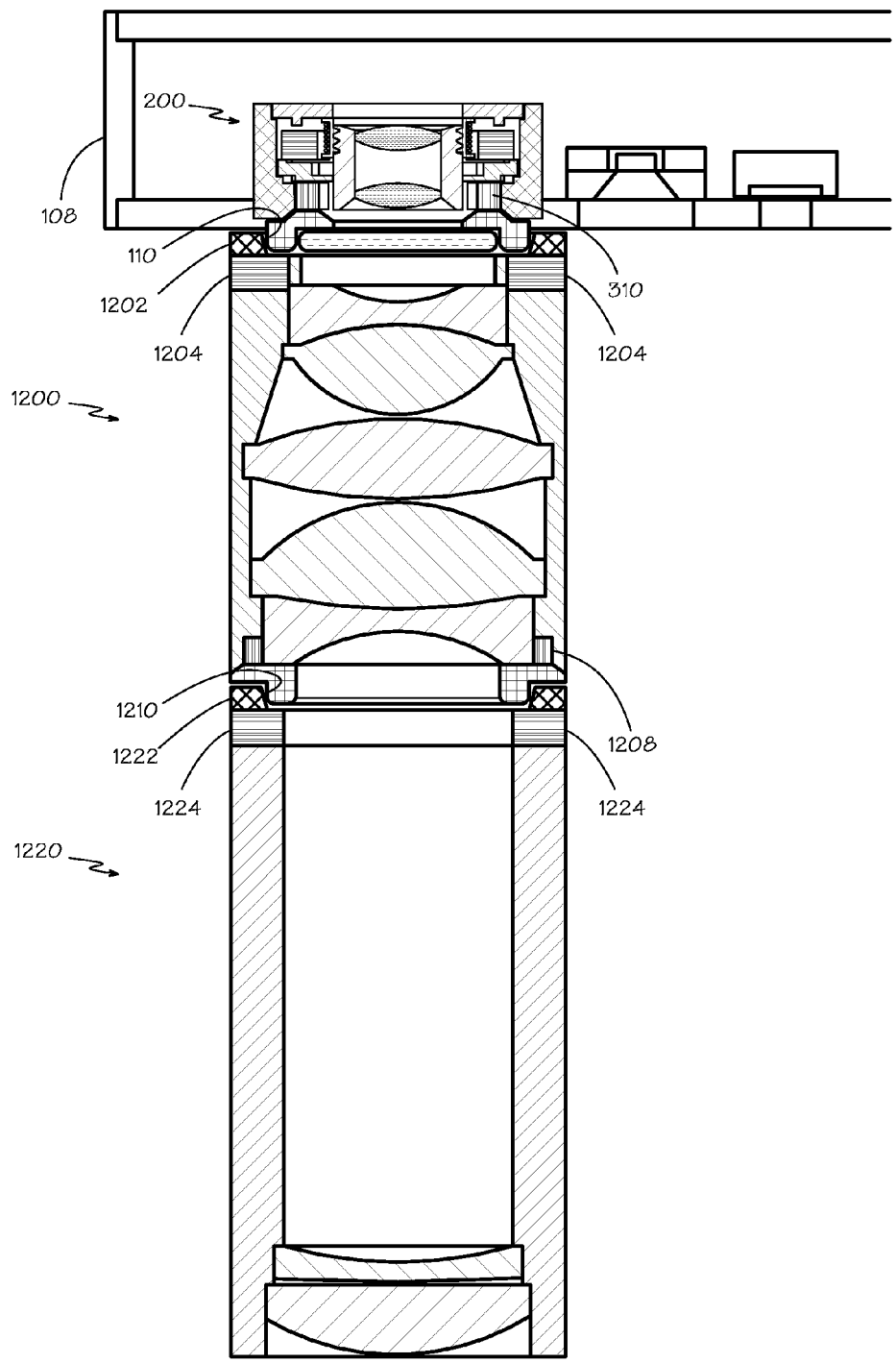
FIG. 12 is a cross-section view of a first detachable lens mounted outside the housing of the compact device and a second detachable lens mounted to the first detachable lens.

FIG. 12 is a cross-section view of another detachable lens 1200 mounted outside the housing 108 of the compact device. A first end 1202 of the first detachable lens 1200 engages the exterior engagement surface 110 of the alignment feature 208 (FIG. 3) to mechanically align the first detachable lens with the optical axis of the optics of the camera module 200. The first detachable lens 1200 includes a retainer 1204 adjacent the first end 1202 of the detachable lens that holds the first detachable lens on the camera housing 108 by magnetically engaging the magnets 310 that are on an opposite side of the camera housing from the surface that engages the alignment feature. The retainer 1204 may be a non-magnetic material that is attracted by the magnets 310 inside the camera housing. In another embodiment, the retainer 1204 may be one or more magnets arranged to be attracted by the magnets 310 inside the camera housing.

The first detachable lens 1200 includes a second alignment feature 1210 and a second magnet 1208 at a second end of the first detachable lens opposite the first end 1202. The second alignment feature surrounds and aligns with an optical axis of the first detachable lens. The second alignment feature provides an engagement surface to mechanically align an optical axis of the second detachable lens 1220 with the optical axis of the first detachable lens. The first detachable lens 1200 further includes a second magnet 1208 at a second end of the first detachable lens opposite the first end 1202. The second magnet 1208 retains the second detachable lens 1220 with the optical axis of the second detachable lens in alignment with the optical axis of the first detachable lens.

In the embodiment illustrated, the second alignment feature 1210 is arranged to be engaged by the second detachable lens 1220 as an alternative to the second detachable lens engaging the alignment feature 208 of the compact device. In other embodiments (not illustrated) the second alignment feature is arranged to be engaged by a second detachable lens that is not capable of engaging the alignment feature of the compact device.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A camera system comprising:
a housing having an aperture;
a camera module mounted inside the housing, the camera module including a lens assembly with an optical path that passes through the aperture;
an alignment feature that surrounds the aperture, aligns with an optical axis of the lens assembly of the camera module, and provides an engagement surface outside the housing to mechanically align a detachable lens with the optical axis of the lens assembly; and
a plurality of magnets mounted inside the housing adjacent to the engagement surface of the alignment feature to retain the detachable lens in alignment with the optical axis of the lens assembly.

2. The camera system of claim 1 wherein:
the lens assembly further includes at least one moveable element;
the camera module further includes a voice coil motor that moveably supports the at least one moveable element of the lens assembly; and
the plurality of magnets are coupled to the camera module and arranged to minimize interference with the voice coil motor and with movement of the at least one moveable element of the lens assembly.

3. The camera system of claim 1 wherein the alignment feature aligns an optical axis of the detachable lens and the optical axis of the of the lens assembly each within $125 \times 10^{-6}$ meters (125 µm) (0.0005 inch) of the optical axis of the lens assembly as defined by the alignment feature.

4. The camera system of claim 1 wherein the alignment feature aligns an optical axis of the detachable lens and the optical axis of the lens assembly each within a one degree angle from the optical axis of the lens assembly as defined by the alignment feature.

5. The camera system of claim 1 further comprising the detachable lens and an additional lens coupled to the detachable lens such that either the detachable lens or the additional lens can selectably engage the alignment feature.

6. The camera system of claim 5 further comprising an additional magnet mounted on the housing at a sufficient distance from the camera module to minimize interference with the voice coil motor, the additional magnet engaging the additional lens when the detachable lens engages the alignment feature.

7. The camera system of claim 1 further comprising the detachable lens, wherein the detachable lens includes two optical elements that each bend the optical path at a right angle.

8. The camera system of claim 1 further comprising the detachable lens, wherein the detachable lens includes a light pipe that directs light from a light source on the housing to a diffuser coupled to the detachable lens at an end furthest from the housing.

9. The camera system of claim 1 wherein the alignment feature further comprise two or more electrically conductive segments coupled by electrically insulating segments.

10. The camera system of claim 1 wherein the alignment feature is formed in a surface of the camera module.

11. The camera system of claim 1 wherein the alignment feature is included in the housing and the camera module engages the alignment feature on the inside of the housing.

12. The camera system of claim 1 further comprising the detachable lens, wherein the detachable lens includes:
a first end;
a second end opposite the first end;
a second alignment feature at the second end of the detachable lens, the second alignment feature surrounding and aligning with an optical axis of the detachable lens, and providing a second engagement surface to mechanically align an optical axis of a second detachable lens with the optical axis of the detachable lens; and
a second magnet at the second end of the detachable lens, the second magnet to retain the second detachable lens in alignment with the optical axis of the detachable lens.

13. A detachable lens comprising:
a surface on a first end of the detachable lens that engages an alignment feature to position an optical axis of the detachable lens within $125 \times 10^{-6}$ meters (125 μm) (0.0005 inch) of an optical axis defined by the alignment feature; and
a retainer that holds the detachable lens on a camera housing by magnetically engaging magnets that are on an opposite side of the camera housing from the surface that engages the alignment feature.

14. The detachable lens of claim 13 wherein the alignment feature aligns the detachable lens with less than a 1 degree angle between the optical axis of the detachable lens and the optical axis defined by the alignment feature.

15. The detachable lens of claim 13 further comprising an additional lens coupled to the detachable lens such that either the detachable lens or the additional lens can selectably engage the alignment feature.

16. The detachable lens of claim 13 wherein the detachable lens includes two optical elements that each bend an optical path in the detachable lens at a right angle.

17. The detachable lens of claim 13 wherein the detachable lens includes a light pipe that directs light from a light source on the housing to a diffuser coupled to the detachable lens at a second end opposite the first end.

18. The detachable lens of claim 13 further comprising a second alignment feature and a magnet at a second end of the detachable lens opposite the first end, the second alignment feature arranged to be engaged by a second detachable lens as an alternative to the second detachable lens engaging the alignment feature.

19. A camera module comprising:
an enclosure having a surface that engages an alignment feature included in a housing that contains the camera module to position an optical axis of the camera module within $125 \times 10^{-6}$ meters (125 μm) (0.0005 inch) of an optical axis defined by the alignment feature;
a lens assembly including at least one moveable element;
a voice coil motor coupled to the enclosure and moveably supporting the at least one moveable element of the lens assembly; and
a plurality of magnets attached to the enclosure adjacent to the alignment feature and arranged to minimize interference with the voice coil motor and with movement of the at least one moveable element of the lens assembly, and to provide a magnetic attachment for a detachable lens that engages the alignment feature on an opposite side of the housing from the camera module.

20. The camera module of claim 19 wherein the alignment feature aligns the camera module with less than a one degree angle between the optical axis of the camera module and the optical axis defined by the alignment feature.

21. A camera module comprising:
an enclosure that provides an alignment feature that extends through a housing, which contains the camera module, and that defines an optical axis of the camera module;
a lens assembly including at least one moveable element;
a voice coil motor coupled to the enclosure and moveably supporting the at least one moveable element of the lens assembly; and
a plurality of magnets attached to the enclosure adjacent to the alignment feature and arranged to minimize interference with the voice coil motor and with movement of the at least one moveable element of the lens assembly and to provide a magnetic attachment for a detachable lens that engages the alignment feature on an opposite side of the housing from the camera module.

22. The camera module of claim 21 wherein the alignment feature aligns the camera module with less than a 1 degree angle between the optical axis of the camera module and the optical axis of the camera module defined by the alignment feature.

* * * * *